FIG. 1

WILLIAM B. SEIDEL
JOHN X. RUSSELL
INVENTORS.

United States Patent Office 3,492,717
Patented Feb. 3, 1970

3,492,717
MACHINE TOOL
William B. Seidel and John X. Russell, Cincinnati, Ohio, assignors to The Cincinnati Milling Machine Company, Cincinnati, Ohio, a corporation of Ohio
Filed Dec. 15, 1967, Ser. No. 691,034
Int. Cl. B23q 1/00
U.S. Cl. 29—568
20 Claims

ABSTRACT OF THE DISCLOSURE

This invention relates to a machine tool and, more particularly, to a single-spindle machine tool with tool storage and interchange means between the storage and spindle.

Background of the invention

There is a well-defined need in a manufacturing system for a machine tool having a high degree of versatility in the processing of relatively small holes. In the recent past, the numerically-controlled tool-changing machine tool has been developed to perform this function. Because of the considerable cost of such machines, however, they have had somewhat limited use, because of amount of time used in changing tools. That is to say, the tool changing time is non-productive and, when this time is long, the machining operations that take place between the changing of tools become uneconomical. Furthermore, these machine tools have in the past been very complicated and, for that reason, have easily gotten out of order; the maintenance and downtime also tend to make such machine tools uneconomical. These and other difficulties experienced with the prior art devices have been obviated in a novel manner by the present invention.

It is, therefore, an outstanding object of the invention to provide a machine tool having very rapid tool-changing capability.

Another object of this invention is the provision of a single-spindle machine tool with multi-tool storage and tool changer, wherein the non-productive time is very short.

A further object of the present invention is the provision of an inexpensive tool-changer machine tool.

It is another object of the instant invention to provide a single-spindle tool-changer machine tool which is simple in construction and which is capable of a long life of useful service with a minimum of maintenance.

A still further object of the invention is the provision of a machine tool with tool changer having a high level of efficiency in the processing of relatively small holes.

Another object of the invention is the provision of a tool changer wherein reciprocatory and rotary motion is provided by very common means.

Another object of the invention is the provision of a tool changer wherein leakage of hydraulic fluid is reduced to a minimum.

Another object of the invention is the provision of a tool changer having a compact actuator and control valve arrangement.

Another object of the invention is the provision of a tool changer having tool-clamping means which can stay with the tool even when it is rotating with the spindle during a machining operation, thus reducing the tool-changing cycle time.

Another object of the invention is the provision of an interchanger that contains within itself all necessary mechanical elements for its operation, so that it can simply be bolted on a machine tool, either to replace a worn or damaged interchanger, or for use in converting a conventional machine tool to tool-changer operation.

Another object of the invention is the provision of an interchanger which, without change of parts, can be mounted in any position relative to the machine tool spindle with which it is to be used, so that the selection of tool storage position is also unlimited.

Another object of the invention is the provision of an interchanger in which the locating surfaces on the tool for the clamping and transfer thereof are such that they can easily be protected from foreign matter.

With these and other objects in view, as will be apparent to those skilled in the art, the invention resides in the combination of parts set forth in the specification and covered by the claims appended hereto.

Summary of the invention

In general, the invention consists of a machine tool having a rotatable spindle, a storage rack for holding tools and presenting the tools one at a time to a position at a right angle to the axis of the spindle, and an interchanger which is rotatable about an axis lying at an angle between the spindle axis and the said position. In the preferred embodiment the interchanger axis bisects the angle between the spindle axis and the axis of a tool in the said position. The interchanger consists of a main shaft which is rotatable about its longitudinal axis and two wing-like arms each of which is hingedly connected at its inner end to the spindle and provided with a tool-grasping apparatus at its outer end.

More specifically, the arms are rotatable about separate spaced parallel axes, each of which is spaced laterally of the shaft axis. The shaft is provided with an axial bore and a piston is reciprocable in the bore. The piston is connected to the arms by a rack-and-gear apparatus to bring about the hinge motion of the arms relative to the shaft.

In addition, the storage rack consists of a loop chain lying in a plane which is parallel to the spindle axis and tool sockets attached to the chain and extending at right angles to the plane of the chain. A drive means is provided to bring a tool socket and its tool to the interchange position.

Brief description of the drawings

The character of the invention, however, may be best understood by reference to one of its structural forms, as illustrated by the accompanying drawings, in which.

Description of the preferred embodiment

Figure 1:
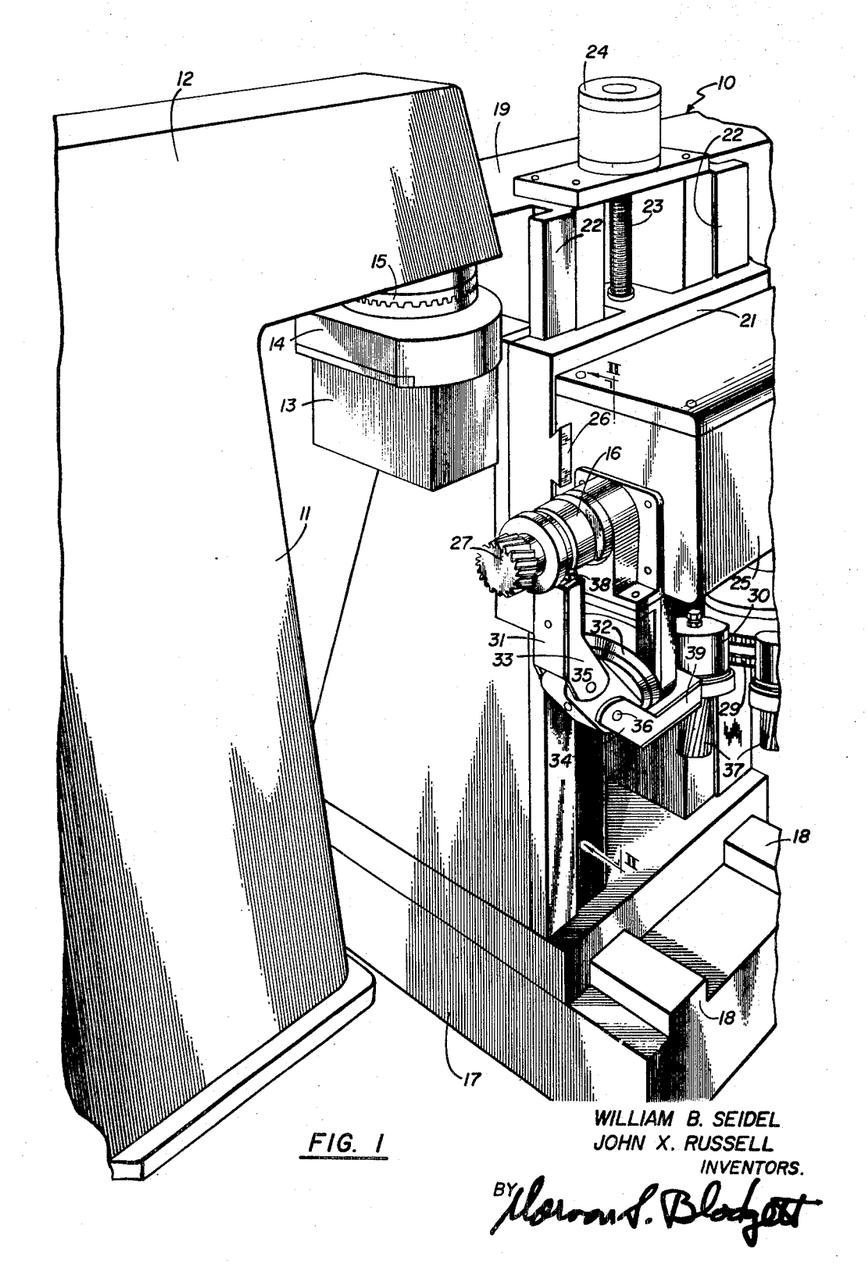
FIG. 1 is a perspective view of a machine tool embodying the principles of the present invention.

Referring to FIG. 1, which best shows the general features of the invention, the machine tool, indicated generally by the reference numeral 10, is shown as a single-spindle, three-axis machine tool capable of tool changing and numerical control. The machine tool is associated with a support 11 having a horizontal abutment 12 from which a workpiece 13 is suspended. The workpiece hangs downwardly from a pallet 14 which, in turn, is attached to the undersurface of the abutment by a connector 15. This connector is constructed to locate the workpiece very accurately relative to the spindle 16 of the machine tool in the manner shown and described in the patent application of Perry et al., Ser. No. 690,941, filed Dec. 15, 1967 for Connector.

The machine tool is provided with a base 17 having horizontal ways 18 for X-axis movement. On these ways is mounted a column 19 having on one side two vertical ways 22 for Y-axis movement. The ways carry a saddle 21 which is operated by a screw 23 rotated by a motor 24. A spindle carrier 25 is mounted for front-to-rear (Z-axis) motion on horizontal ways 26. A tool 27 is shown in place in a socket on the spindle 16. Under the spindle carrier 25 is mounted a tool rack 28 lying in a horizontal plane parallel to the axis of the spindle 16. Forming part of the tool rack is an endless chain 29 which carries a plurality of tool sockets 30. When held in the sockets, the tools 37 hang downwardly with their axes perpendicular to the plane of the chain, that is to say, vertically.

Mounted on the front of the spindle housing or carrier 25 under the spindle 16 is an interchanger 31 consisting of a rotatable shaft 32 on which are hingedly mounted two oppositely-directed arms 33 and 34, the connection of the inner ends of the arms to the shaft taking place through hinge pins 35 and 36, respectively. The outer ends of the arms 33 and 34 are provided with a tool-grasping clamp 38 and 39, respectively.

Figure 2:
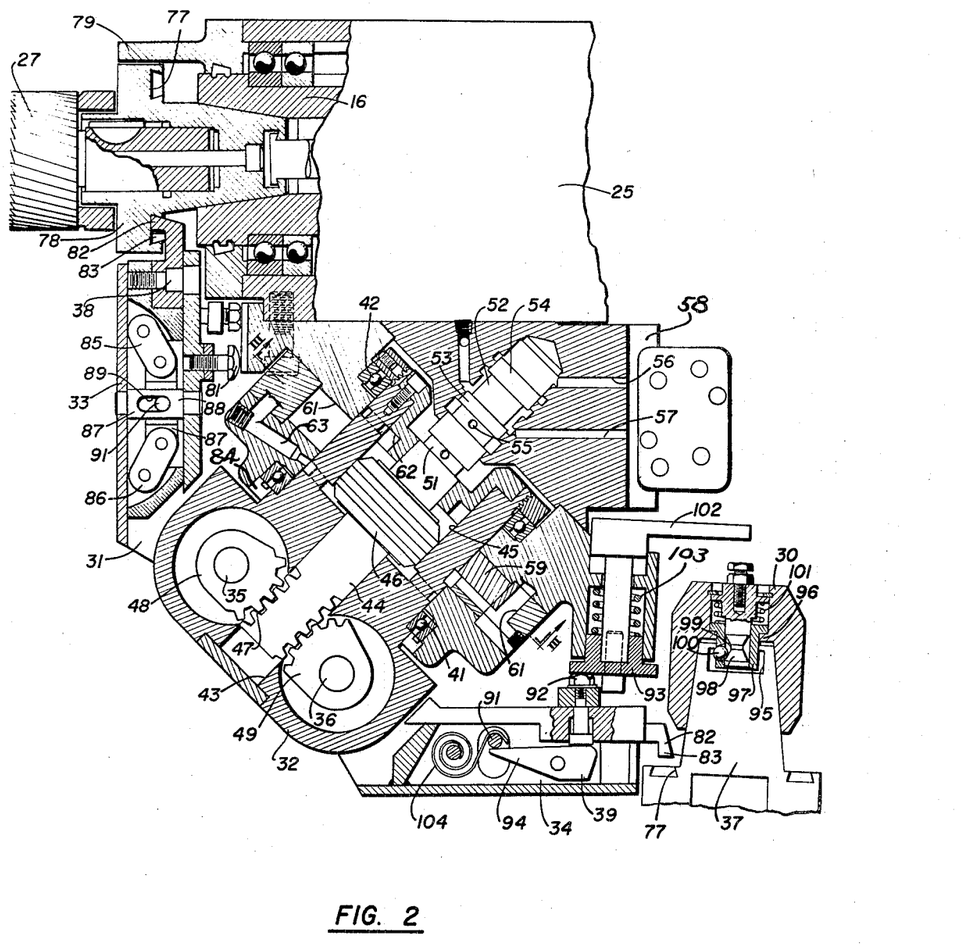
FIG. 2 is a vertical sectional view of the invention taken on the line II—II of FIG. 1.

FIG. 2 shows the details of the interchanger 31. The shaft 32 is mounted in bearings 41 and 42 and is provided with a coaxial bore 43 in which is slidably mounted a rod 44. The shaft is provided with an enlarged bore or cylinder 45 in which slides a piston 46 mounted on the rod. The outer end of the rod 44 is provided with a rack 47 which engages and rotates gear segments 48 and 49 which are, in turn, keyed to the hinge pins 35 and 36 to which the inner ends of the arms 33 and 34, respectively, are keyed.

The rearward end of the rod 44 is provided with a pair of annular grooves 51 and 52 defined by lands 53 and 54. The spacing between the lands permits communication with a central passage 55 through the rod. Pressure fluid is supplied into the cylinder 45 to one side or the other of the piston 46. This fluid pressure brings about a shifting of the piston, axial movement of the rod 44 and of the rack 47, and rotary movement of the gear segments 48 and 49 for similar movement of the arms 33 and 34. At the same time, the lands move to effect communication between an inlet passage 56 and an outlet passage 57 which, in turn, lead to a connector housing 58 having a plurality of ports communicating with a pilot valve 67 with a housing 68.

Figure 3:
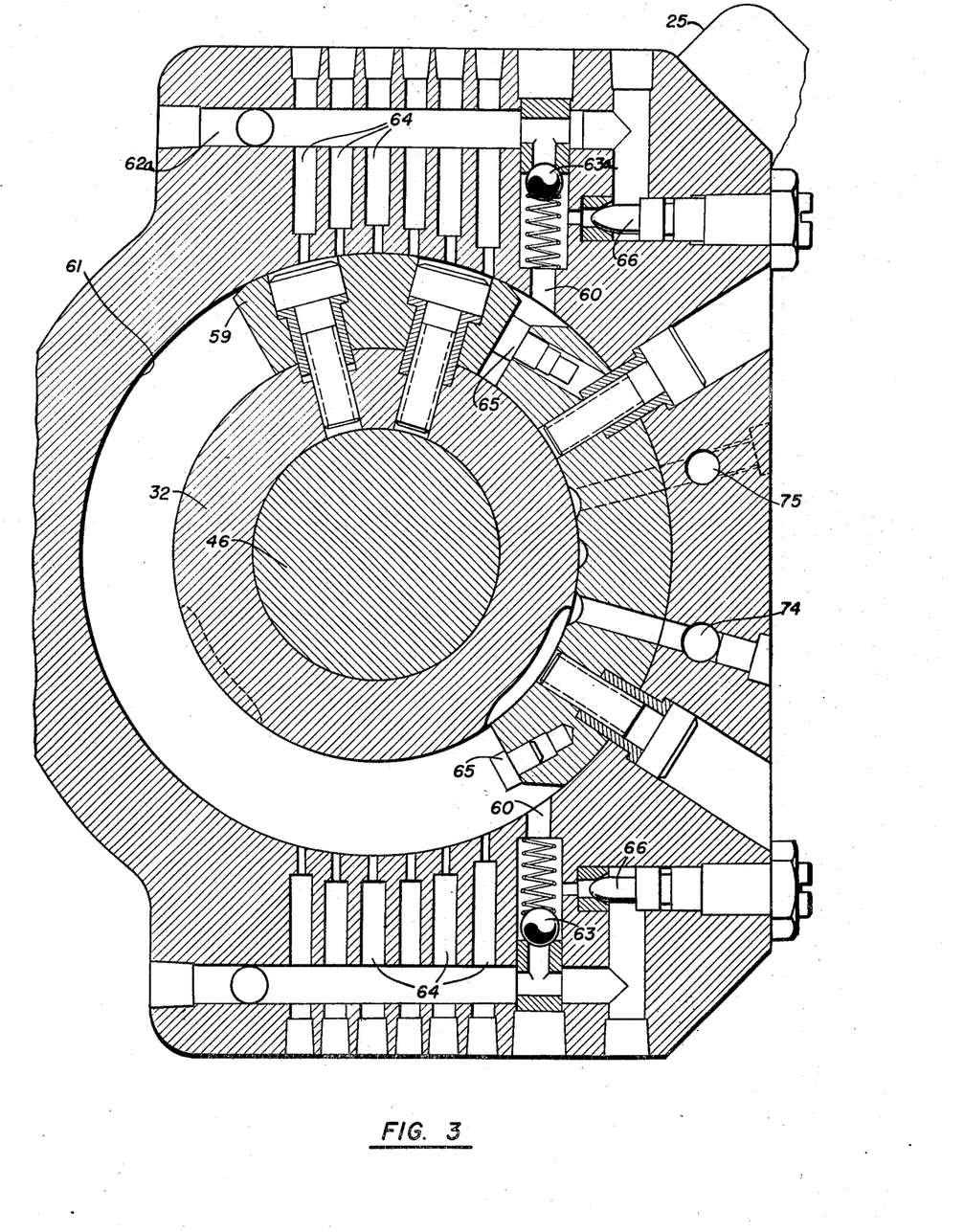
FIG. 3 is a sectional view of the invention taken on the line III—III of FIG. 2.

Attached to the exterior of the shaft 32 in the same general area as the piston 46 is a vane 59 movable in an annular chamber 61. Pressure fluid is admitted to the proper side of the vane 59 by means of a passage 60 to produce rotation of the shaft 32 and the arms 33 and 34. Passages 62 and 63 are shown entering opposite ends of the cylinder 45 to produce reciprocation of the piston. Counterclockwise motion of the vane 59 is brought about by pressure fluid flow through a port 62a and a check valve 63a. Downstream of check valve 63a is a passageway 60 connecting to the chamber 61. When the chamber 61 is pressurized, the vane 59 is driven in a counter-clockwise direction. A controlled rate of deceleration is achieved by the face of the vane progressively closing off escape ports 64 as it approaches terminal position achieved by contacting adjustable stop screw 65. The velocity at the time of contacting the stop screw 65 is controlled by setting an adjustable needle valve assembly 66. For rotation in the clockwise direction, the arrangement for the automatic deceleration, final terminal velocity, and terminal position is duplicated on the opposite side of the housing.

Figure 4:
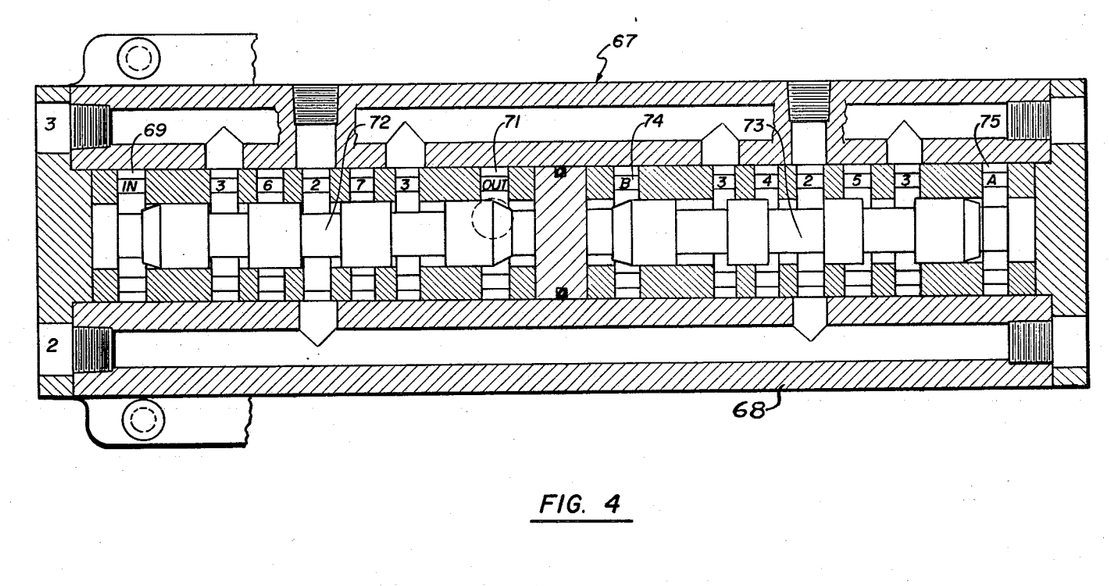
FIG. 4 is a sectional view of a valve used in connection with the invention.

FIG. 4 is a cross-sectional view of a pilot or spool valve 67 having a housing 68. This valve is mounted on the connector housing 58 (FIG. 2) and is hydraulically interconnected by such mounting with orifice passageways 69. The valve includes a pair of axially-disposed spool members 72 and 73 each shiftable in accordance with changes of hydraulic fluid pressure from the passages 69 and 71 and passages 74 and 75, respectively, in the vane motor assembly. In accordance with the axial shifting of these spool members 72 and 73, there is further communication established between predetermined parts and passages.

Figure 5:
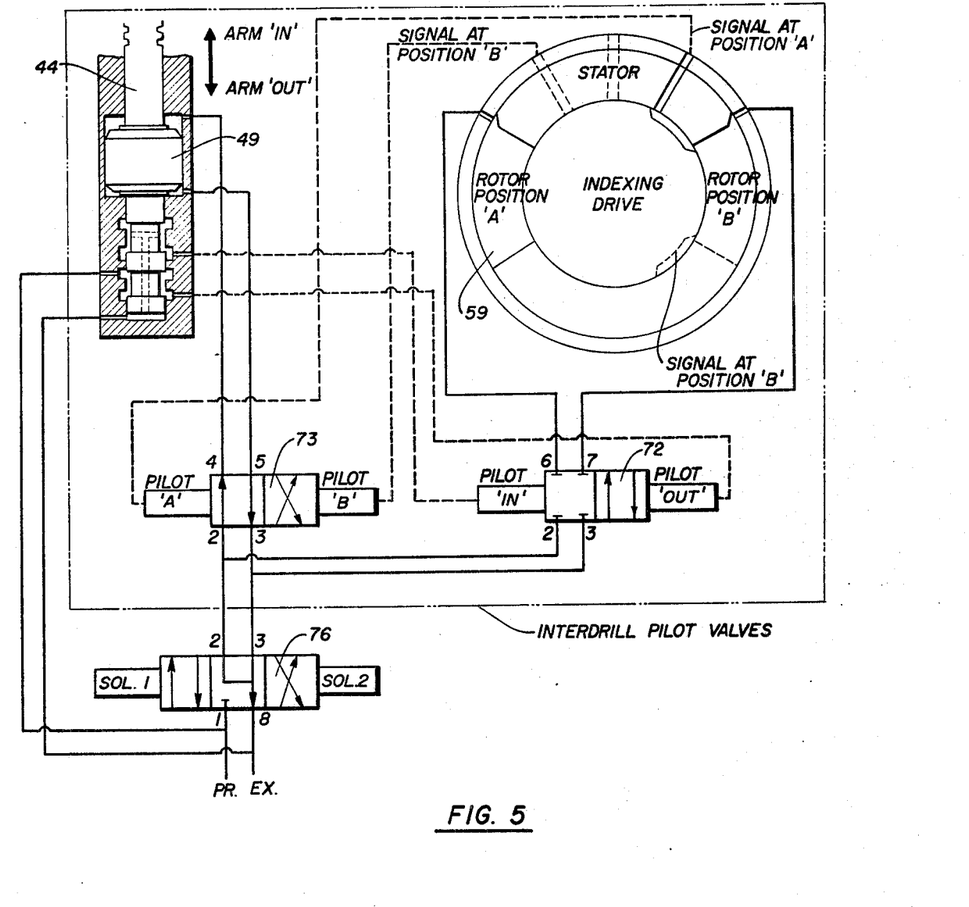
FIG. 5 is a schematic diagram of the hydraulic interconnections in the invention.

FIG. 5 is a hydraulic diagram showing the interconnection of the passages, conduits, and ports of the tool interchanger, whereby it operates entirely by hydraulics rather than having electrical switching or limit switch devices. The interface between the tool changer and the numerical control unit is through a 3-position solenoid valve 76.

Returning now to FIG. 2, the arms 33 and 34 are provided at their ends with a means of gripping and releasing the tools 27 and 37 in the form of the clamps 38 and 39. As is evident from the drawing, the actual tool is mounted in a standard tool holder body, but for the purpose of the discussion, this assembly will be referred to as a "tool." When the arm 33 is in its terminal position, it has just delivered a tapered tool to the corresponding socket in the spindle 16 and the opposite corresponding arm 34 has just delivered a tool 37 into a socket 30 of the storage rack 28. The clamp 38 on the arm 33 is caused to unclamp and to provide clearance between a dovetail groove 77 located on a radial surface of a flange 78 of the tool. Surrounding the major portion of the circumference of the tool flange 78 is a protecting shroud 79 whose function is to prevent chips and other contaminants from contacting the backside of the tool flange with its dovetail groove or of the spindle socket. As the interchanger arm 33 approaches the terminal position in the delivery of a tool to the spindle, an adjustable stop 81 is used to control the precise position that the arm will occupy at the end of its travel. As the arm approaches this terminal position, the dovetail grip portions 82 and 83 are caused to telescope sufficiently for clearance to exist between the dovetail groove 77 and the grip portions 82 and 83. These portions, however, remain in place within the groove even during the turning and machining operation, but this clearance prevents any interference with the operation. The operation of the vane 57 in its chamber 61 assures the positioning of the arms 33 and 34 at 180° extremes in position. The arms are capable of articulated pivotal movement, as has been described.

It is necessary to use only one seal 84 for the entire interchanger assembly. It is evident that all conduits and passages are integral and present a minimum of leakage problems. A compact interchanger and one which is simple results, so that maintenance is minimized.

The operation of the portions 82 and 83 of the tool-grasping clamp 38 is brought about by use of a toggle consisting of links 85 and 86 whose adjacent ends are pivotally connected to a hub 87. This hub is slidable laterally of the arm over a shaft 88. The shaft has a longitudinal slot 89 and a pin 91 extending through the hub 87 also extends through the slot. The operation of the toggle shortens the distance between the non-adjacent ends of the links 85 and 86. The outer end of the link 85 is connected to the portion 82, while the outer end of the link 86 pushes the portion 83; the extension of the toggle (by movement of the pin to the left) causes the portions 82 and 83 to move apart and press in opposite directions against the inclined sides or surfaces of the dovetail groove 77 of the tool.

At the other end of the interchanger the arm 33 or 34 which occupies that position must not only release the tool by providing clearance between the surfaces of the dovetail groove and the clamping portions, but the clamping portions must be withdrawn axially from the groove so that the tool rack can be moved to bring various tools into the interchange position. For that purpose, as the arm approaches the terminal position, a bolt 92 strikes a spring-cushioned stop 93 extending from the interchanger housing. The bolt is slidably mounted in the arm and, when it strikes the stop, the arm continues to move. The bolt strikes one end of a rocker arm 94 and its other end pushes the pin 91 upwardly. The toggle is shortened, thus drawing the clamping portions 82 and 83 together. The arm continues to move upwardly (driven by the rack 47 operating through the gear segment 49) and the portions move upwardly out of the dovetail groove. In the final stop position of the arm, the clamping portions are entirely clear of the groove.

Before the clamp 39 entirely releases the tool 37, it is necessary that the tool be securely locked in the socket 30. The end of each tool 37 is provided with a bore 95 having an inwardly-directed flange 96. Slidable into the bore is a sleeve 97 which is slidably mounted in the socket 30. In this sleeve is slidably mounted a spool member 98 which has a double-cone groove 99 which is spring-biased upwardly against a stop in the socket 30. A detent ball 100 lies in a suitable opening in the sleeve 97 and protrudes into the part of the bore 95 behind the flange 96. This is the condition shown in FIG. 2, with a coil spring 101 pulling the spool member 98 so that the lower conical surface of the groove 99 cams against the detent ball and pushes it laterally behind the flange 96. This holds the tool 37 securely in the socket 30, the other tools being held in the tool rack 28 in the same way. When the arm 34 arrives at the tool rack after an interchange cycle, it is carrying a tool 37 and an empty socket 30 is located at the interchange position of the tool rack. At that time, an arm 102 extending from the upper end of the slidable stop 93 is bearing on the upper end of the plunger or spool member 98, so that the detent ball 100 is free to move laterally into the deepest part of the groove 99 between the conical surfaces. The tool, therefore, can move freely into the socket until the spool member 98, the sleeve 97, and the ball 100 lie well within the bore 95 inwardly of the flange 96. The subsequent engagement of the arm with the stop 93 drives it upwardly against the pressure of a spring 103 and lifts the arm 102 from the upper end of the spool member 98. The spool member is pushed upwardly by the spring 101, so that the lower conical surface of the groove 99 cams the ball 100 sideways and locks it behind the flange 96. The clamp 39 is then free to release the tool. The tool rack is then actuated to bring the next tool to be used to the interchange position. When the interchange cycle starts, the arm 34 moves downwardly, releasing the stop 93, so that the spring 103 draws the stop and arm 102 downwardly. The arm 102 contacts the spool member 98 and pushes it downwardly, so that the ball 100 is free to move radially inwardly and release the tool. Before the tool is completely released, however, the clamp 39 has grasped the tool. As soon as the arm 34 moves away from the stop, the rocker arm 94 is freed and a spring 104 pushes the pin 91 downwardly, thus straightening the toggle and forcing the tool-grasping portions 82 and 83 apart in the dovetail groove 77.

Figure 6:
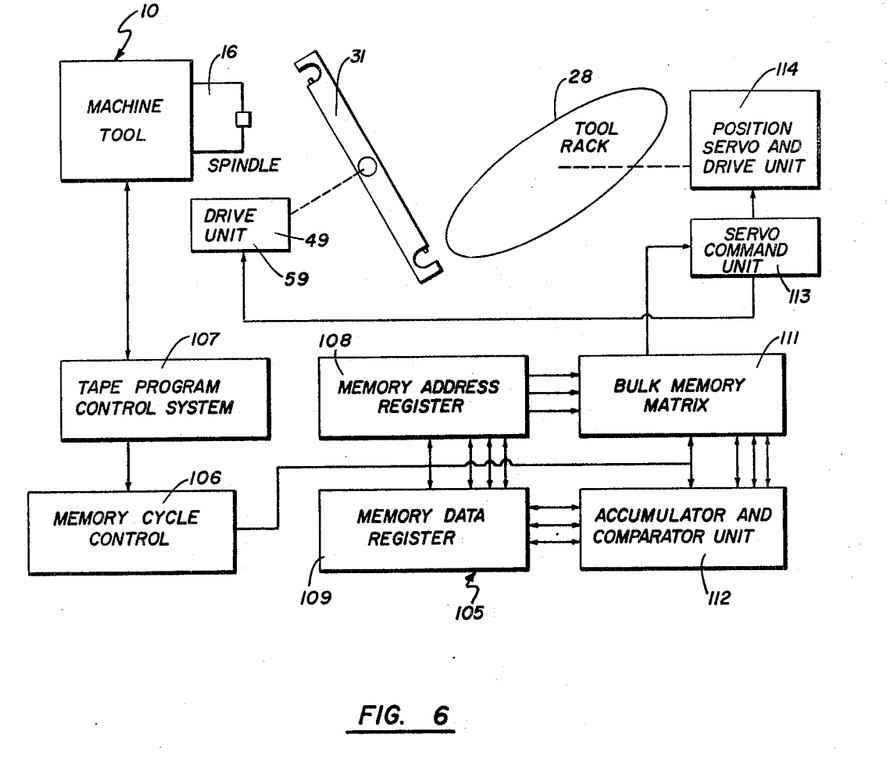
FIG. 6 is a diagram showing the control interconnections of the invention.

In the prefered embodiment, the machine tool and the tool-changing cycle are regulated by a numerical control appartus 105. To begin with, the system does not employ direct tool coding, i.e., sensed identification carried directly on the tool. The storage magazine or tool rack 28 is a random storage unit, wherein any tool may be stored in any socket. It is the function of the control system to account for any changes in actual tool location as they come about through interchanges between the tool rack and the machine spindle. It maintains a record of the location of all tools in the system for access, when required, to permit a series of automatic tool changes in a pre-programmed control mode of operation.

The control 105 consists of a memory cycle control 106, a tape program control system 107, a memory address register (M.A.R.) 108, a memory data register (M.D.R.) 109, a bulk memory matrix (memory) 111, and an accumulator and comparator unit (Acc.) 112. The matrix 111 is connected to a servo command unit 113 which, in turn, operates a position servo and drive unit 114 which operates the tool rack 28. At the same time, the servo command unit 113 operates the drive unit associated with the interchanger 31.

Assuming that the tool rack has been filled with tools and the position of each tool in the rack has been set up initially in the control 105, a cycle proceeds as follows:

(1) The identification number of a new tool is first transferred into the Acc. 112 from the program control system 107.

(2) The M.A.R. 108 is set at an initializing condition for the first or beginning tool data address.

(3) The tool number at this beginning address is read from the memory 111 into the M.D.R. 109.

(4) The comparison portion of the Acc. 112 determines whether the Acc. 112 and M.D.R. 109 contain coinciding numbers.

(5) If there is no coincidence of the tool numbers in the Acc. and M.D.R., the M.A.R. 108 is incremented or advanced one address position and steps 3 and 4 are repeated. The steps 3, 4, and 5 will repeat cyclicly until coincidence of tool numbers in the Acc. and M.D.R. occurs.

(6) When coincidence is found between the Acc. and M.D.R. contents, a positioning command signal from unit 113 is output to the tool storage magazine servo unit 114.

(7) The tool identified by the new tool number in step 1 is physically removed from the tool rack 28 and transported to the spindle 16. The tool previously in the spindle is transferred to the tool rack at the same socket 30 from which the new tool was removed.

The accounting interchange within the data-keeping units of the control is now made after a feed-back signal indicating completed tool change. The next series of cycle steps perform this function.

(8) The address in the M.A.R. which is the location at which the new tool number was held in the memory is transferred to the M.D.R.

(9) The M.A.R. is now set to address 000, which is a "scratch pad," fixed address.

(10) The address in the M.D.R. is now inserted in the memory at the 000 address.

(11) The M.A.R. is then set to a fixed address called "spindle" which is the address for holding the spindle tool number in the memory.

(12) The tool number in the spindle address is transferred to the M.D.R. This is the identity of the tool just returned in step 7 from the spindle to the magazine.

(13) The tool number being held in the Acc. since step 1 is now stored by insertion into the memory at the spindle address. This is the identity of the tool that has been placed in the spindle at step 7.

(14) The contents of the M.D.R. are now transferred into the Acc. This is the identity of the tool that was returned from spindle to storage by step 7.

(15) The scratch pad address 000 is set into the M.A.R.

(16) The contents at the 000 address of the memory are transferred to the M.D.R. This is the address of the memory from which the tool just placed in the spindle came.

(17) The address contained in the M.D.R. is now transferred to the M.A.R.

(18) The contents of the Acc. are transferred into the memory at the address just set in the M.A.R. This places the number of the tool just removed from the spindle into the memory at the address where identity of the new tool in the spindle was previously stored. The accounting procedure is completed by this step.

Figure 7:
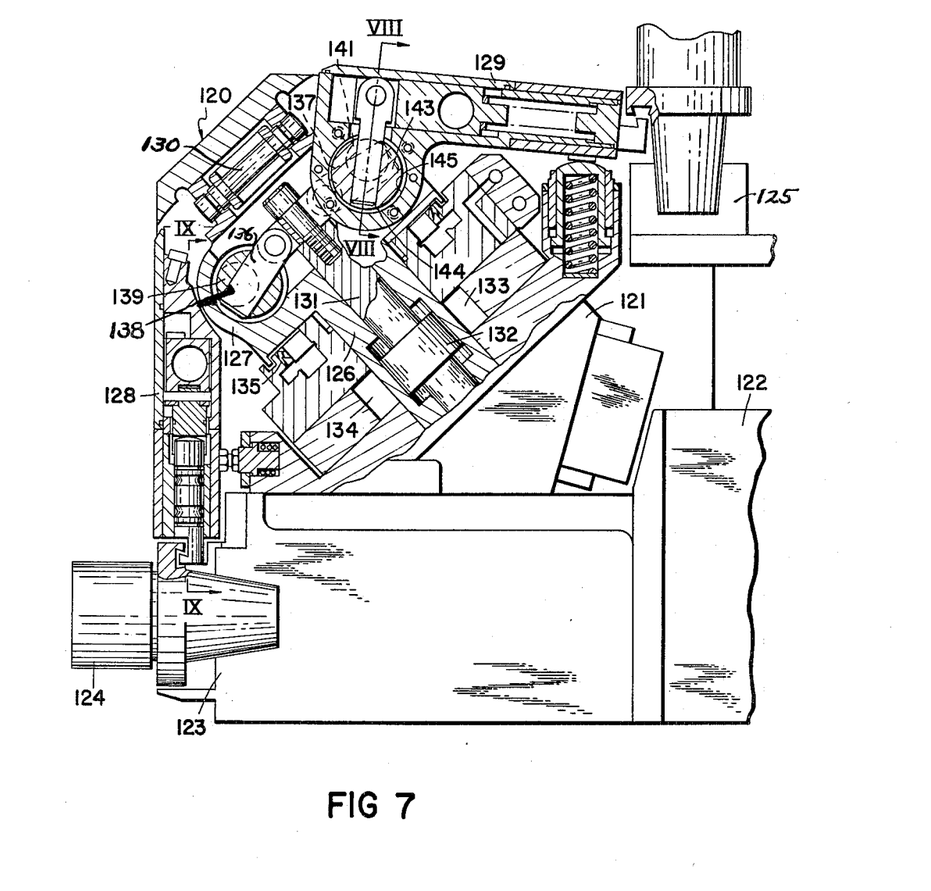
FIG. 7 is a vertical sectional view of a modified form of the invention.
Figure 8:
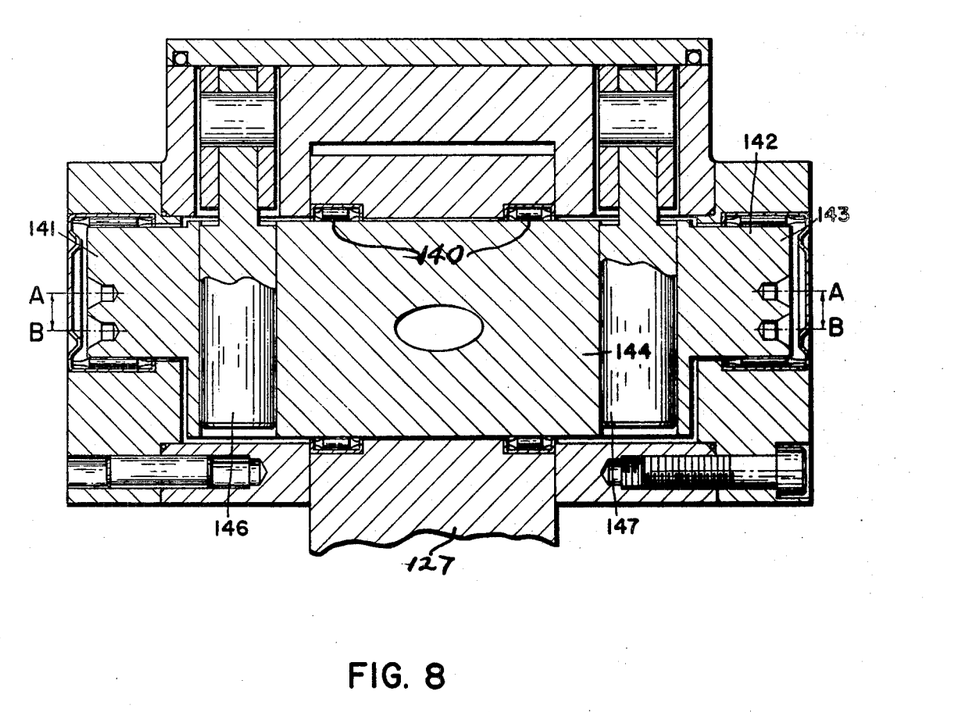
FIG. 8 is a sectional view taken on the line VIII—VIII of FIG. 7.
Figure 9:
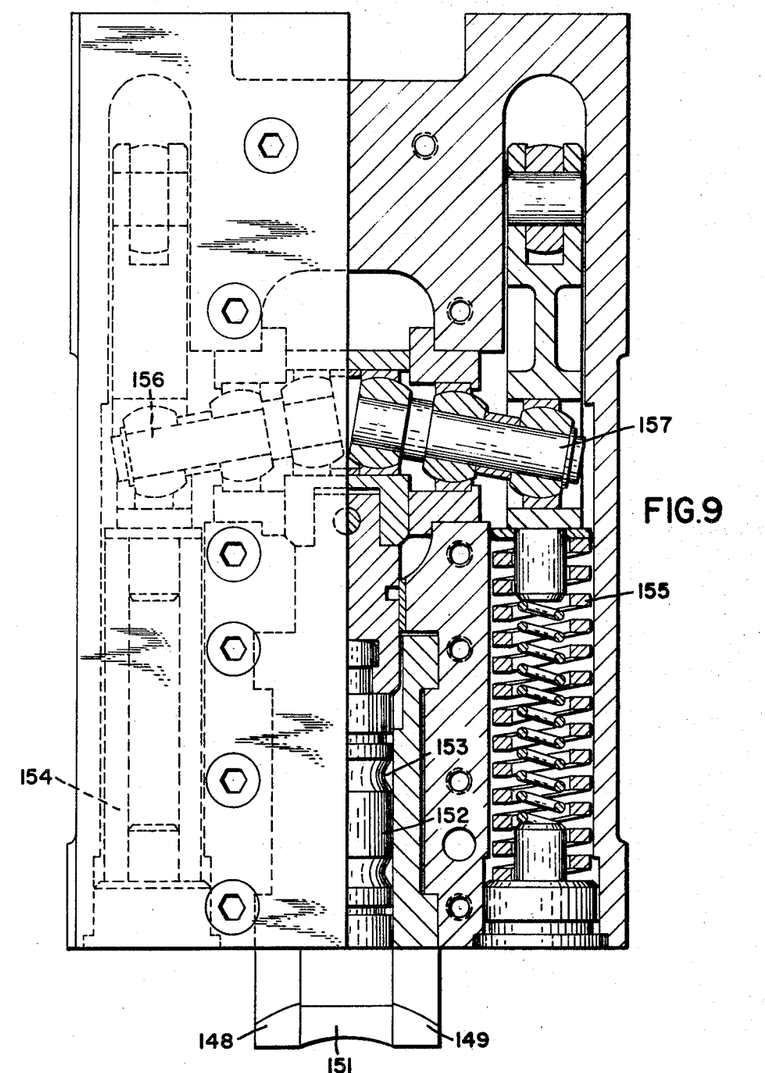
FIG. 9 is a sectional view taken on the line IX—IX of FIG. 7.

Referring to FIGS. 7, 8, and 9, the interchanger, indicated generally by the reference numeral 120, is shown as having a housing 121 which is mounted on a machine tool 122. The machine tool is provided with a rotatable spindle 123 and adapted to receive a tool 124 for performing a machining operation. At a position on the machine tool remote from the spindle is located a tool storage facility 125.

Extending from the housing 121 is a shaft 126 having an enlarged outer head 127 to which are hingedly attached two arms 128 and 129. A rod 131 is slidably mounted in the shaft 126 and is provided with a piston 132 to provide such relative longitudinal motion. Surrounding the shaft is an annular chamber 133 in which is movable a vane 134 extending radially from the shaft. To the inner end of the rod is attached a spool valve (not shown) which controls the flow of pressure fluid to the piston to bring about reciprocation. Between the facing surfaces of the head 127 and the housing 121 extends a flexible annular seal 135.

Pivotally attached to opposite sides of the outer end of the rod 131 are levers 136 and 137 whose outer ends are cylindrically formed. This end of the lever 136 is snugly but slidably carried in a bore 138 extending transversely through a hinge pin 139. Similarly, the lever 137 resides in a transverse bore in a hinge pin 143. This hinge pin is rotatably mounted by the fact that it is provided with a central cylindrical portion mounted in the housing 127 by means of needle bearings 140 for rotation about an axis B—B. The end portions 141 and 142 of the hinge pin are cylindrical also, but with a displaced axis A—A. The arms 128 and 129 are rotatably mounted on these end portions of the hinge pin by needle bearings on the axis A—A. The arm and the hinge pin are connected by pins 146 and 147 which are hingedly connected to the arm and slidably carried in transverse bores in the hinge pin. In the same way, the hinge pin 139 is carried in the head 127 and connected to the arm 128.

The manner in which the clamping means associated with the arm 128 is constructed is best shown in FIG. 9. Outer fingers 148 and 149 are fixed relative to the arm and almost all clamping motion is accomplished by the movement of a center finger 151. The finger 151 is formed with a cylindrical shank 152 which is slidably carried in a bore 153 formed in the arm. The finger is pressed toward outward position by two coil springs 154 and 155 operating through two levers 156 and 157, respectively. These are first degree levers with the center pivot being in the form of a ball-and-socket joint. When the arms 128 and 129 have been swung to their outermost position, they contact the stop 130 and go no farther. However, the piston 132 continues to carry the rod 131 inwardly and this motion operates to rotate the hinge pins 139 and 143 still further. Those, in turn, rotate the pins 146 and 147 (associated with the arm 129) and the corresponding pins associated with the arm 128. These pins operate through connecting links to the levers 156 and 157 (of the arm 129) and corresponding levers of the arm 128, to move the movable finger still further and produce a greater gripping face on the tool holder.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A machine tool, comprising:
    (a) a housing having a rotatable spindle,
    (b) a storage rack for holding tools and presenting the tools one at a time to a position at a substantial angle to the axis of the spindle, and
    (c) an interchanger rotatable about an axis lying at a substantial angle to the spindle axis and the axis of a tool in the said position for exchanging a tool attached to the spindle with another tool from the said position, the axis of the interchanger bisecting the angle between the spindle axis and the axis of the tool in said position.

2. A machine tool as recited in claim 1, wherein the interchanger includes a main shaft which is rotatable about its longitudinal axis and two arms each of which is capable of hinge motion about an axis perpendicular to the shaft axis.

3. A machine tool as recited in claim 2, wherein the arms are rotatable about separate spaced parallel axes, each of which is spaced laterally of the shaft axis.

4. A machine tool as recited in claim 2, wherein the shaft is provided with an axial bore and wherein a rod is reciprocable in the bore and is connected to the arms to bring about the said hinge motion.

5. A machine tool as recited in claim 4, wherein each arm is connected to the shaft by a hinge pin, wherein a gear segment is also connected to the hinge pin, and wherein a rack attached to the rod engages the gear segment.

6. A machine tool as recited in claim 1, wherein the storage rack is a loop chain lying in a general plane parallel to the spindle axis, wherein tool sockets are attached to the chain and extend perpendicular to the plane, and wherein means is provided to drive the chain to bring the tool sockets and tools seriatim to the said position.

7. A machine tool, as recited in claim 2, wherein the said main shaft has a piston fixed thereto, wherein the piston is slidably mounted in a cylinder, wherein an annular chamber extends around the cylinder, and wherein a vane is operative in the chamber to rotate the cylinder and piston about the axis of the shaft.

8. A machine tool as recited in claim 7, wherein the cylinder is of tubular form with a bore in which the piston slides and wherein the vane extends radially from its exterior.

9. A machine tool as recited in claim 2, wherein the main shaft emerges from a bore in the housing and carries a head in which the said arms are mounted, the housing and the head having facing radial faces, and wherein an annular seal extends between the surfaces to allow relative rotary movement without leakage of fluids within the housing, the shaft being the only movable mechanical element emerging from the housing.

10. A machine tool as recited in claim 2, wherein the said main shaft is provided with a coaxial piston for producing reciprocable movement and wherein a coaxial valve spool is provided non-coextensively of the piston for controlling the flow of hydraulic fluid to and from the piston for the control of the said movement.

11. A machine tool as recited in claim 10, wherein the spool is directly connected to the main shaft for movement therewith.

12. A machine tool as recited in claim 2, wherein each arm is mounted on a hinge pin and each hinge pin is connected to the shaft by a lever, so that reciprocation of the shaft causes rotation of the hinge pins and hinge motion of the arms.

13. A machine tool as recited in claim 12, wherein each lever slidably resides in a transverse bore in its respective hinge pin.

14. An interchanger for use with a machine tool having a rotatable spindle and a storage rack remote from the spindle, comprising
    (a) a housing,
    (b) a main shaft which is rotatable about its longitudinal axis and two arms rotatable therewith, and
    (c) a clamping means at the end of each arm for grasping a tool, the clamping means being capable of remaining with the tool even when it is operatively connected to the rotatable spindle.

15. An interchanger as recited in claim 14, wherein each tool is provided with a coaxial annular groove of dovetail cross-sectional shape, and wherein the clamping means consists of at least two closely-spaced fingers operative to enter the groove and move forcefully in opposite axial directions, the fingers having surfaces complementary to the dovetail shape of the groove.

16. An interchanger as recited in claim 15, wherein the fingers are connected to the opposite ends of a center-supported toggle mounted in the arm, lateral movement of the center of the toggle serving to move the fingers to clamp and unclamp positions.

17. An interchanger for use with a machine tool having a rotatable spindle and a storage rack remote from the spindle, comprising:
   (a) a housing,
   (b) a shaft which is rotatable about its longitudinal axis and two arms rotatable therewith, and
   (c) clamping means associated with the outer end of each arm, the housing containing all valves and actuators necessary for the operation of the interchanger, so that no mechanical connections need be made exteriorly of the interchanger.

18. An interchanger as recited in claim 15, wherein each tool is provided with a flange having a radial surface, wherein the said groove opens on that surface, and wherein the fingers approach and leave the groove generally in the axial direction.

19. An interchanger as recited in claim 18, wherein a shield extends from the machine tool around the spindle and extends axially closely around the outer periphery of the flange to prevent entrance of foreign matter to the groove.

20. An interchanger for use with a machine tool having a rotatable spindle and a storage rack remote from the spindle, comprising:
   (a) a housing,
   (b) a main shaft which is rotatable about its longitudinal axis,
   (c) two arms mounted on the shaft for hinged motion about separate spaced parallel axes, each axis being perpendicular to the axis of the shaft and each axis being spaced laterally of the shaft axis,
   (d) a hinge pin rotatably mounted in the shaft to hold each arm to provide the hinged motion, each hinge pin having an eccentric portion which resides in a corresponding bore in the arm,
   (e) a rod reciprocably mounted concentrically of the shaft, and
   (f) two links, each hingedly connected to the rod and non-hingedly connected to a hinge pin, so that reciprocation of the rod causes rotation of the hinge pin and hinged motion of the arm, the eccentric portion causing the axis of hinged motion of the arm to be laterally displaced from the axis of rotation of the hinge pin.

References Cited

UNITED STATES PATENTS 3,233,321  2/1966  Anthony _____________ 29—568

FRANCIS S. HUSAR, Primary Examiner